United States Patent
Nygren et al.

(10) Patent No.: US 12,505,014 B1
(45) Date of Patent: Dec. 23, 2025

(54) DRAM ECC CIRCUIT ERROR DETECTION INTEGRITY

(71) Applicant: Advanced Micro Devices, Inc., Santa Clara, CA (US)

(72) Inventors: Aaron John Nygren, Boise, ID (US); Eric M. Scott, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/752,740

(22) Filed: Jun. 24, 2024

(51) Int. Cl.
*H03M 13/00* (2006.01)
*G06F 11/10* (2006.01)

(52) U.S. Cl.
CPC ...... *G06F 11/1068* (2013.01); *G06F 11/1016* (2013.01)

(58) Field of Classification Search
CPC ............... G06F 11/073; G06F 11/1068; G06F 11/1048; G06F 11/1016
See application file for complete search history.

(56) References Cited

U.S. PATENT DOCUMENTS

| | | | | |
|---|---|---|---|---|
| 8,151,173 B2* | 4/2012 | Hirose | ................. | G11C 7/1006 714/763 |
| 9,983,930 B2* | 5/2018 | Quach | ................... | G06F 3/0679 |
| 10,572,343 B2* | 2/2020 | Halbert | ................... | G11C 29/52 |
| 10,811,078 B2* | 10/2020 | Cha | ....................... | G11C 11/406 |
| 10,824,505 B1* | 11/2020 | Swarbrick | ........... | G06F 11/1048 |
| 10,956,262 B2* | 3/2021 | Golov | ................. | G06F 12/0804 |
| 11,068,342 B1* | 7/2021 | Alrod | ................... | G06F 11/1048 |
| 11,170,870 B1* | 11/2021 | Sharon | ................... | G11C 29/42 |
| 11,327,838 B2* | 5/2022 | Park | ...................... | G06F 11/1048 |
| 11,710,532 B2* | 7/2023 | Troia | ............... | G11C 29/12015 365/185.09 |
| 2011/0154157 A1 | 6/2011 | Naeimi | | |
| 2014/0173378 A1 | 6/2014 | O'Connor et al. | | |
| 2020/0341840 A1 | 10/2020 | Chang et al. | | |
| 2021/0359710 A1 | 11/2021 | Jo et al. | | |
| 2023/0367672 A1 | 11/2023 | Kim et al. | | |

OTHER PUBLICATIONS

International Search Report and Written Opinion for PCT/US2025/028446 dated Sep. 11, 2025.

* cited by examiner

*Primary Examiner* — Esaw T Abraham
(74) *Attorney, Agent, or Firm* — Patterson + Sheridan, LLP

(57) ABSTRACT

Implementations herein describe a system including a system-on-chip including at least a host and a dynamic random-access memory (DRAM) in communication with the SoC, the DRAM including at least an error correction code engine, the system configured to allow the host to write first data to the DRAM, calculate parity bits for the first write data, store the first write data and the parity bits in a DRAM core of the DRAM, allow the host to write second data to the DRAM, store the second write data in the DRAM core without calculating parity bits for the second write data, enable the DRAM to calculate parity bits of the second write data and compare the parity bits of the second write data to the parity bits of the first write data, and calculate a syndrome based on a comparison to correct errors detected in the DRAM core.

20 Claims, 6 Drawing Sheets

DRAM ECC CIRCUIT ERROR DETECTION INTEGRITY

BACKGROUND

Double Data Rate Synchronous Dynamic Random-Access Memory (DDR SDRAM or simply DRAM) technology is the widely used for main memory in almost all applications today, ranging from high-performance computing (HPC) to power-, area-sensitive mobile applications. This is due to DDR's many advantages including high-density with a simplistic architecture, low-latency, and low-power consumption. JEDEC, the standards organization that specifies memory standards, has defined and developed four DRAM categories to guide designers to precisely meet their memory requirements: standard DDR (DDR5/4/3/2), mobile DDR (LPDDR5/4/3/2), graphic DDR (GDDR3/4/5/6), and high bandwidth DRAM (HBM2/2E/3).

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
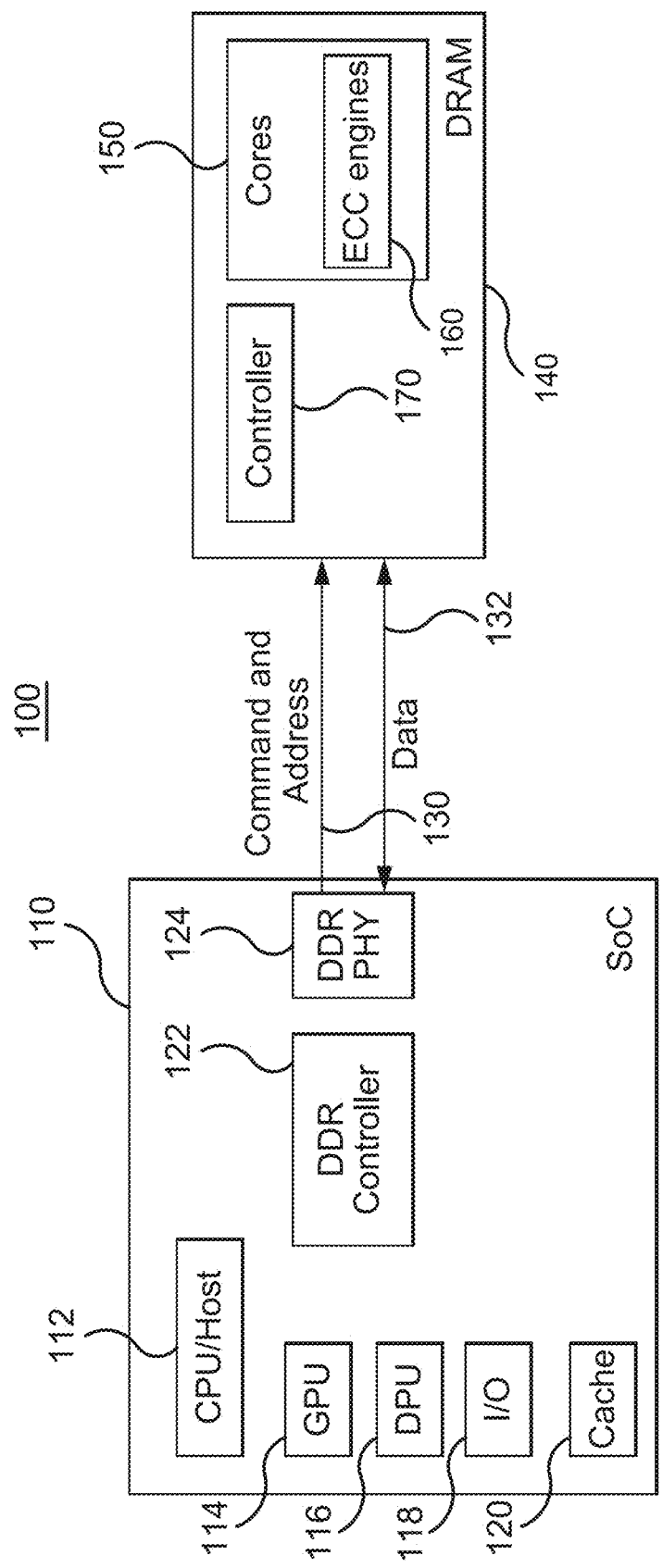
FIG. 1 illustrates a system including a system-on-chip (SoC) in communication with a dynamic random-access memory (DRAM) including error correction code (ECC) circuits, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the implementations herein or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Dynamic Random Access Memory (DRAM) can communicate with a system-on-chip (SoC). DRAM can include error correction code (ECC) circuits. The SoC sends error patterns to the ECC circuit of the DRAM to test the ECC circuits for integrity. Existing solutions use a parity bit error pattern to test a local area of the ECC circuits of the DRAM. However, all the ECC paths are not tested and certain portions of the ECC circuits are also not tested because a syndrome is fed as an error vector and there are no data patterns to generate parity check bits. Accordingly, there is a need to develop systems and methods for testing all the ECC circuit paths to expand error coverage capabilities of the ECC circuit of the DRAM.

DRAM is a type of volatile memory used in computers and other electronic devices for storing data and program code that a processor needs to access quickly. Unlike static RAM (SRAM), which uses a latching circuit to store each bit of data, DRAM uses a capacitor and transistor to store each bit. The "dynamic" aspect of DRAM refers to the fact that the capacitors holding the data need to be periodically refreshed, typically every few milliseconds, to prevent the data from decaying. This refreshing process consumes some power, but it allows DRAM to be denser and less expensive compared to SRAM.

DRAM is commonly used as the main memory (RAM) in computers, where it serves as a temporary storage for data that the CPU is actively using. However, because it is volatile memory, meaning it loses its stored information when power is removed, DRAM needs to be used in conjunction with non-volatile storage such as hard disk drives (HDDs) or solid-state drives (SSDs) for long-term data storage.

There are several standards and types of DRAM that have been developed over the years to meet different performance and power requirements. Some of the most common DRAM standards include SDRAM and DDR SDRAM.

Synchronous DRAM (SDRAM) was the first type of DRAM to synchronize itself with the CPU's bus, allowing for higher speed data transfer. SDRAM operates synchronously with the system bus speed, which helps in achieving faster data transfer rates.

Double Data Rate Synchronous DRAM (DDR SDRAM) introduced the ability to transfer data on both the rising and falling edges of the clock signal, effectively doubling the data transfer rate compared to traditional SDRAM. DDR has gone through several generations including DDR2, DDR3, DDR4, and DDR5, each offering improvements in speed, power efficiency, and capacity.

DRAM can include error correction code (ECC) circuits. ECC is a technique used to detect and correct errors that occur during data storage or transmission in digital systems, including computer memory, storage devices, and communication channels. ECC adds extra bits to the data being stored or transmitted, allowing the detection and correction of errors that may occur due to various factors such as electrical noise, interference, or component failures.

ECC memory modules are commonly used in servers and high-end computing systems to detect and correct memory errors, ensuring data integrity and system reliability.

DRAMs include ECC circuits that detect and correct errors in the DRAM core. However, the integrity and capability of the ECC circuits themselves should also be tested. The DRAM ECC circuits are not standardized and thus there is a wide range of test patterns that are used to determine the integrity of the ECC circuits themselves.

The example implementations test the entire ECC circuit path including the DRAM and the system-on-chip (SoC). Error patterns may be injected by the SoC to test the DRAM and the SoC response. This is achieved through a defined protocol on the DRAM interface. The example implementations thus determine the error coverage capability of the DRAM ECC circuit, determine the integrity of the expected error coverage of the DRAM ECC circuit, and determine the integrity of the SoC response circuits to the DRAM ECC error correction and detection.

The example implementations test the entire ECC circuit path including the DRAM and the system-on-chip (SoC) by allowing the host to write first data to the DRAM, calculating parity bits for the first write data using the ECC engine, storing the first write data and the parity bits in a DRAM core of the DRAM, allowing the host to write second data to the DRAM, and storing the second write data in the DRAM core without calculating parity bits for the second write data. The example implementations then allow the host to read the second write data from the DRAM core, enable the DRAM to calculate parity bits of the second write data and compare the parity bits of the second write data to the parity bits of the first write data, and calculate a syndrome based on a comparison between the parity bits of the second write data and the parity bits of the first write data to correct errors detected in the DRAM core. The special write operation without the parity calculation can be enabled in the test mode by various methodologies. In one instance, the original correct data is not written and a wait is employed for the erroneous data before writing. In another instance, the parity bit writes are masked when writing the erroneous data. In yet another instance, the original check bits are stored and written with the erroneous data.

FIG. 1 illustrates a system including a system-on-chip (SoC) in communication with a dynamic random-access memory (DRAM) including error correction code (ECC) circuits, according to an example.

The system 100 includes a SoC 110 in communication with a DRAM 140.

The SoC 110 is an integrated circuit (IC) that incorporates most or all of the components of a computer or electronic system onto a single chip. This includes components such as a central processing unit (CPU) or host 112, a graphical processing unit (GPU) 114, a data processing unit (DPU) 116, memory (RAM) or cache 120, input/output (I/O) interfaces 118, storage controllers, such as a DDR controller 122, a DDR PHY 124 and various other components necessary for the functioning of the system.

The DDR controller 122 is responsible for managing the flow of data between the CPU or host 112 and the DDR memory modules. The DDR controller 122 controls the timing of read and write operations, manages the addressing of memory locations, and handles the synchronization of data transfers. The DDR controller 122 interprets the commands issued by the host 112 or other processing units and translates them into signals that can be understood by the DDR memory modules. As such, the DDR controller 122 interprets memory access requests from the host 112 or other processing units within the SoC 110 and coordinates the transfer of data to and from the DRAM.

The DDR PHY 124 is an interface (physical interface) between the DDR controller 122 and the DDR memory modules. The DDR PHY 124 converts digital signals from the DDR controller 122 into analog signals suitable for transmission over the memory bus (not shown) to the memory modules. The DDR PHY 124 also receives and processes the analog signals from the memory modules, converting them back into digital signals that can be understood by the DDR controller 122. The DDR PHY 124 also manages the timing and voltage levels of the signals to ensure reliable communication between the DDR controller 122 and the memory modules.

Together the DDR controller 122 and the DDR PHY 124 work in tandem to facilitate high-speed data transfer between the host 112 and the DDR memory modules in a computer system.

The DRAM 140 includes a controller 170 and DRAM cores 150. In one example, the DRAM cores 150 may be referred to as DRAM cores 150 and may include ECC engines 160. In another example, the ECC engines 160 are not embedded in the DRAM cores 150. Instead, the ECC engines 160 may be located on a datapath or in an auxiliary die. The DRAM cores 150 are the central part of the DRAM chip where the memory cells are located. The DRAM cores 150 is where the data is stored in the form of electrical charges in capacitors. The DRAM cores 150 are organized into rows, columns, banks, and ranks. The DRAM cores 150 are accessed by the host 112 via the command and address signals 130.

The SoC 110 sends command and address signals 130 to the DRAM 140 to initiate read or write operations. The command and address signals 130 include instructions such as row activate, column read, column write, precharge, and refresh commands. The command and address signals 130 further include address signals to specify the location of the data to be accessed. The address signals can include row addresses and column addresses, which are used to select the appropriate memory cells within the DRAM. The SoC 110 also sends data signals 132 containing actual data to be written to or read from the DRAM modules. For example, the data signals include write data (WD) and read data (RD). Additionally, clock signals may be exchanged between the SoC 110 and the DRAM 140. The clock signals may be synchronized clock signals used to coordinate the timing of data transfers between the SoC 110 and the DRAM 140. The clock signals ensure that the data is transferred at the correct rate and timing to maintain data integrity.

Referring back to the DRAM 140, the ECC engines 160 include ECC test modes. The ECC engines 160 work as follows:

Before data is stored or transmitted, the ECC engines 160 generate additional redundant bits based on the original data. These redundant bits are calculated using mathematical algorithms, such as parity-checking schemes or more advanced codes like Hamming codes or Reed-Solomon codes. The additional bits are then appended to the original data to form an ECC codeword.

The ECC codeword, consisting of both the original data and the redundant bits, is stored in memory or transmitted over a communication channel.

When the data is read from memory or received at the destination, the ECC engines 160 recalculate the redundant bits based on the received data. If any errors have occurred during storage or transmission, the calculated redundant bits will not match the received redundant bits. This discrepancy indicates that an error has occurred.

The ECC engines 160 use the redundant bits to identify and correct errors in the received data. By analyzing the patterns of errors detected, ECC algorithms can often determine which bits are incorrect and correct them automatically. Depending on the ECC scheme used, errors can be corrected up to a certain threshold, beyond which the errors are deemed uncorrectable.

In the example implementations, the ECC engines 160 themselves need to be checked for errors. In other words, systems and methods are developed to determine whether the ECC engines 160 themselves include errors. Thus, the integrity of the ECC circuits themselves is tested.

Figure 2:
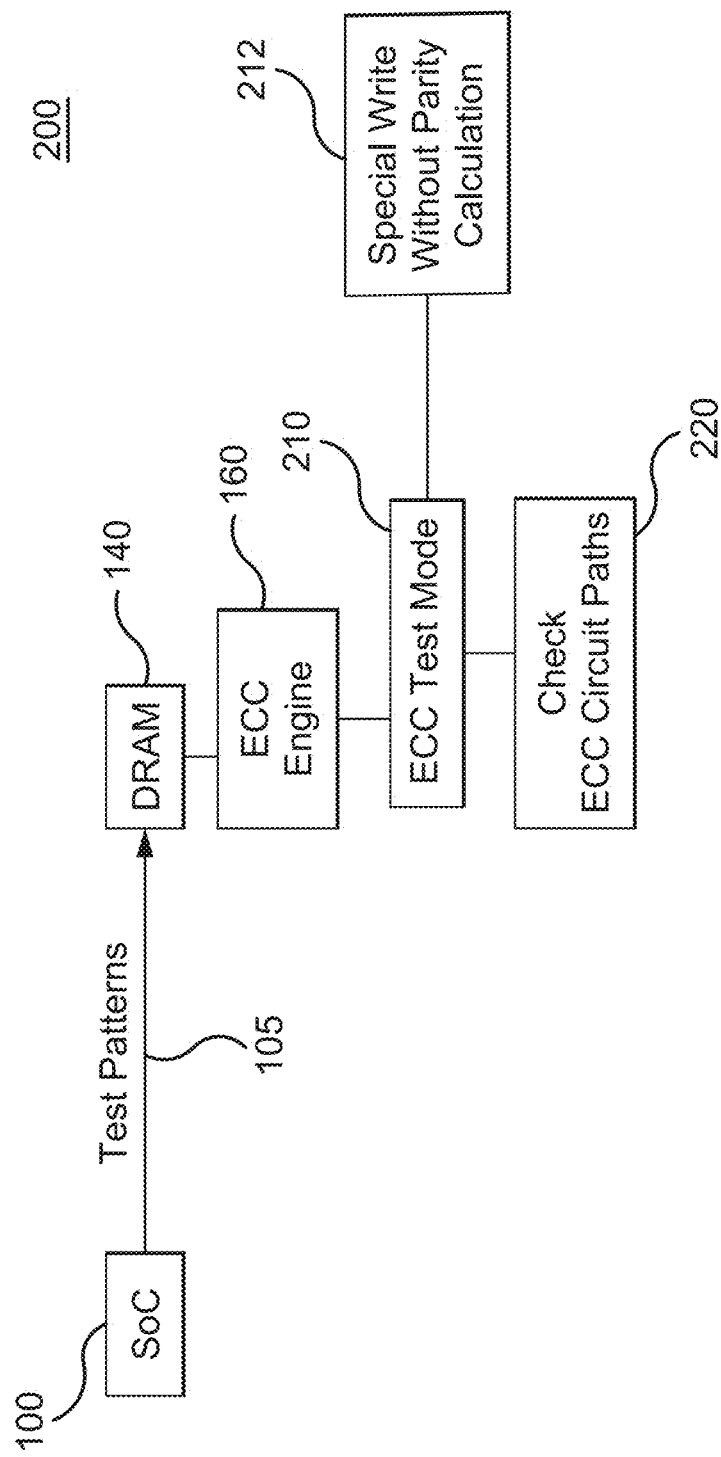
FIG. 2 illustrates the DRAM including an ECC engine having an ECC test mode, according to an example.

FIG. 2 illustrates the DRAM including an ECC engine having an ECC test mode, according to an example.

The block diagram 200 shows test patterns 105 transmitted from the SoC 110 to the DRAM 140. The DRAM 140 includes at least one of the ECC engines 160 for performing ECC test modes 210. One ECC test mode is a special write 212. The special write 212 is an ECC test mode performed without parity calculations. The ECC test mode 210 checks the ECC circuit paths 220.

Parity checking is a method used to detect errors in data transmission or storage by adding an extra bit to the transmitted or stored data. This extra bit, known as a parity bit, is calculated based on the number of bits set to 1 in the data. The basic idea behind parity checking is to ensure that the total number of bits set to 1 in the data, including the parity bit itself, is either always even or always odd, depending on the chosen parity scheme (even parity or odd parity).

In parity checking, before transmitting the data, a sender calculates the parity bit based on the data. If using even parity, the sender sets the parity bit so that the total number of bits set to 1 (including the parity bit) is even. If using odd parity, the sender sets the parity bit so that the total number of bits set to 1 (including the parity bit) is odd. The sender then appends the calculated parity bit to the data and transmits it. Thus, there are two types of parity, even parity and odd parity. In even parity, the parity bit is set so that the total number of 1s in the byte, including the parity bit, is an even number. In odd parity, the parity bit is set so that the total number of 1s in the byte, including the parity bit, is an odd number. If they don't match, it indicates that an error has occurred, and the data may be corrupted.

In parity checking, upon receiving the data, the receiver recalculates the parity bit based on the received data (excluding the appended parity bit). If the calculated parity bit matches the received parity bit, it indicates that the data is likely free of errors. However, if the calculated parity bit does not match the received parity bit, it indicates that an error may have occurred during transmission or storage.

Parity checking is a simple and efficient method for detecting errors, especially single-bit errors. However, it cannot correct errors, only detect them. For more robust error detection and correction, more advanced techniques like checksums or cyclic redundancy checks (CRC) are used. The purpose of a parity bit is to ensure the integrity of the data being transmitted or stored.

A syndrome refers to a set of error patterns that are indicative of particular types of errors that may occur during memory operations. DRAM memory cells can experience errors due to various factors such as electrical noise, manufacturing defects, or degradation over time. When errors occur in DRAM, they can manifest in different ways, leading to different symptoms or patterns of errors. Syndromes are used in error correction techniques such as ECC to identify and correct errors in DRAM. ECC schemes typically use codes that generate syndromes based on the observed errors in the memory data. These syndromes are then compared against a table of known error patterns to determine the type and location of the error.

When an error is detected in DRAM, the syndrome generated by the ECC mechanism helps in pinpointing the error and correcting it if possible. By analyzing the syndrome, the ECC system can often identify which memory cell or cells are affected and take appropriate corrective action, such as rewriting the correct data or flagging the erroneous memory region for replacement. The DRAM may flag the errors based on different levels of severity. Levels of severity can range from minor errors to critical errors. Minor errors may be corrected in real-time, whereas critical errors may involve system intervention. Thus, a syndrome is a pattern or signature generated by error detection and correction mechanisms to identify and address errors that occur during memory operations.

Referring back to FIG. 2, the special write 212 is an ECC test mode 210 of at least one of the ECC engines 160 where a write occurs without calculating new parity bits. The example implementations test the entire ECC circuit paths 220 including the DRAM 140 and the SoC 110 by allowing the host 112 to write first data to the DRAM 140, calculating parity bits for the first write data using the ECC engine 160, storing the first write data and the parity bits in a DRAM core (i.e., the DRAM cores 150) of the DRAM 140, allowing the host 112 to write second data to the 140 DRAM, and storing the second write data in the DRAM core (i.e., the DRAM cores 150) without calculating parity bits for the second write data.

The second write data is referred to as the special write. The second write data is written without calculating parity bits. As such, the second write data is erroneous data. A delta between the first write data (with parity bit calculation) and the second write (without parity bit calculation) data defines an error pattern. Therefore, the special write operation or special write command allows for the writing of an error mask to the DRAM data pattern. The host 112 then reads the data from the DRAM cores 150 of the DRAM 140. The data read from the DRAM core 150 is the data which was previously written. The parity bits are calculated from the first write. Upon reading new data from the last write, new parity bits are generated to be compared to the stored parity bits. The combination of the parity bits generates the syndrome. The combination may be generated by an XOR operation. The syndrome is used to determine the error bit position in the codeword.

The special write feature or special write operation can be referred to as a write protocol. The write protocol includes a new type of command code to designate the "write without parity calculation." In other words, the second write data can be written without calculating parity bits. This can be accomplished by employing different modes or protocols. These different modes are described below with reference to FIG. 3.

Figure 3:
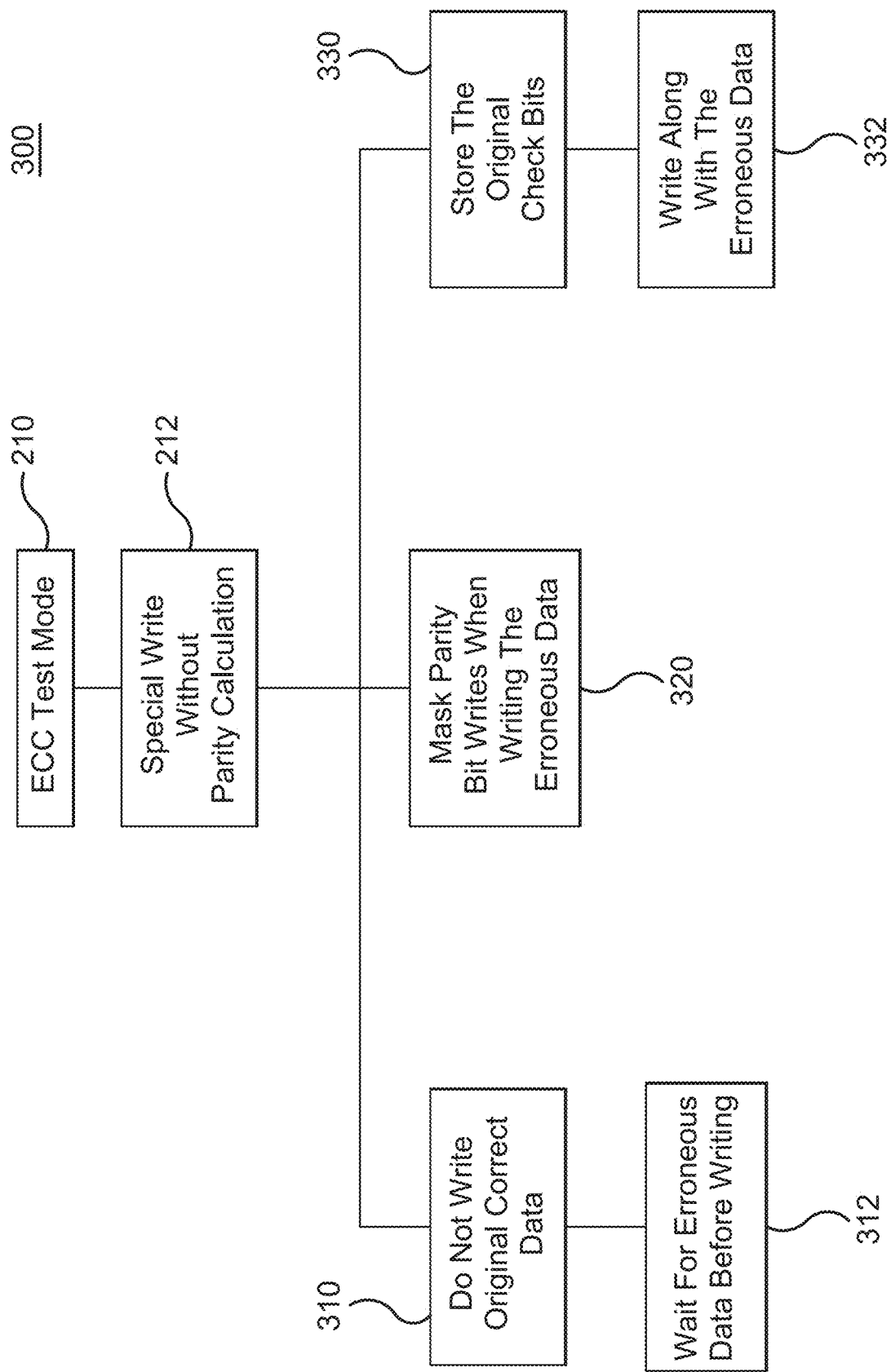
FIG. 3 illustrates methods of implementing a special write feature of the ECC test mode, according to an example.

FIG. 3 illustrates methods of implementing a special write feature of the ECC test mode, according to an example.

The block diagram 300 depicts different implementations of the special write feature of the ECC test mode 210. The ECC test mode 210 performs a special write 212 without parity calculations. This special write can be referred to as a write protocol. The write protocol is a command instructing writing of the second data to the DRAM core 150 without parity calculation. The write protocol is thus a protocol configured to purposely write an error mark to the DRAM data pattern. In another example, the special write may use either erroneous data or the mask pattern.

In a first implementation, data is transferred to the DRAM 140, but not written in the DRAM core 150. The parity can be calculated from that data. The second write data designating the error pattern (or erroneous data) in then written in the DRAM core 150 along with the parity bits.

At block 310, the original correct data is not written in the DRAM core 150.

At block 312, the system waits for the erroneous data. Once the erroneous data is received by the DRAM 140, it is written in the DRAM core 150 along with the parity bits.

Therefore, parity bit writes are not written in the DRAM core 150 until the erroneous data is written in the DRAM core 150.

In a second implementation, the original data is written in the DRAM core 150 and the parity bits are calculated. A mask pattern is then written in the DRAM core 150, which defines the error positions, but not the actual data. The mask pattern flips the bits of the original data. As such, the original data does not need to be known to the DRAM 140, in contrast to the first implementation.

At block 320, the parity bit writes are masked when writing the erroneous data in the DRAM core 150.

In a third implementation, the data is written to the DRAM core 150 along with the calculated parity bits. The special write operation writes to the DRAM core 150 without calculating the parity bits. The third implementation may take longer than the first implementation, but may be less burdensome for the DRAM 140.

At block 330, the original check bits are stored.

At block 340, the original check bits are written along with the erroneous data. The check bits are stored and written along with the data in a memory system that uses error detection and correction mechanisms, such as an ECC memory of the ECC engines 160. Blocks 330 and 340 can thus be performed in parallel.

However, blocks 310, 320, and 330 are not performed in parallel. The three implementations are performed independently of each other. Each implementation may be selected based on a number of factors, such as speed, error correction capability, and system complexity to achieve specific design goals and use cases. In certain applications, ensuring robust error detection and correction capabilities to maintain data integrity may be prioritized. In other applications, balancing between fast data access and the overhead of ECC operations may be prioritized. For advanced DDR memory systems, integration may take priority and thus incorporating error correction capabilities directly into the DRAM may be implemented to reduce latency and improve efficiency. In advance DDR memory systems, speed may take priority and thus achieving faster error detection and correction without burdening external memory controllers may take priority. As a result, determining which implementation to implement for testing all the ECC paths may be dependent on balancing speed, error correction capability, and system complexity.

The three implementations of the example implementations test all the ECC circuit paths. This is achieved by using a new protocol. The new protocol is a write protocol. The write protocol is a new type of command code. The command code designates a "write without parity calculation." For example, first data is written to the DRAM core. Parity bits for the first data is calculated by the ECC engine of the DRAM. Then, second data is written to the DRAM core. However, parity bits are not calculated for the second data. This is the new write protocol, which includes a special command. The special command is "write without parity calculation." Since parity bits are not calculated for the second data, the second data can be referred to as erroneous data. The test pattern is defined by a delta between the first data (with parity calculation) and the second data (without parity calculation).

The special command would be enabled in a test mode. In other words, the new test mode to test the ECC circuit would include the special command instructing a write of certain data without parity calculation. The test mode including the special command can be implemented in three ways.

The first way to implement the new test mode (or write protocol), is by transferring first data to the DRAM, but not writing the first data in the DRAM core. The parity bits can be calculated from that first data. A new set of data, or second data, designating a test error pattern in then written in the DRAM core along with the parity bits. The second data is the erroneous data. A comparison is then made between the second data and the first data.

The second way to implement the new test mode (or write protocol), is by writing the first data in the DRAM core and calculating the parity bits for the first data. A mask pattern (or parity error pattern) is then written, which defines the error positions, but not the actual data. The mask pattern flips the bits of the first data. As such, the first data does not need to be known in contrast to the first implementation.

The third way to implement the new test mode (or write protocol), is by writing the first data to the DRAM core along with the calculated parity bits for the first data. The second data is written to the DRAM core without calculating the parity bits for the second data. The third implementation may take longer than the first implementation, but may be less burdensome for the DRAM.

Figure 4:
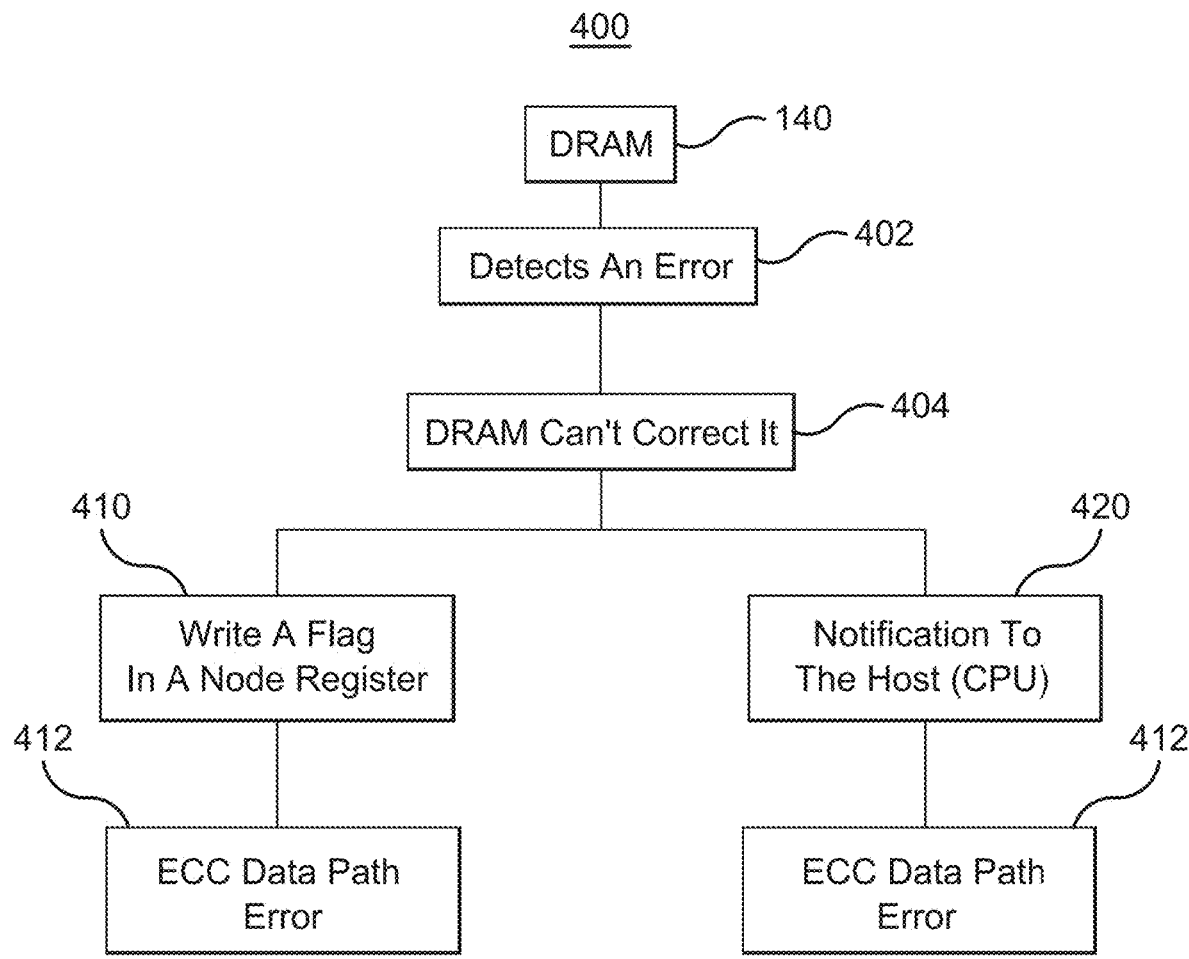
FIG. 4 illustrates a process flow after the DRAM detects errors in the ECC circuits, according to an example.

FIG. 4 illustrates a process flow 400 after the DRAM detects errors in the ECC circuits, according to an example.

The special write feature or command allows for the writing of an error mask to the DRAM data pattern. There are certain actions that the DRAM 140 can take based on detected errors in the ECC circuits. If the DRAM 140 detects that it can't correct the errors detected in the ECC circuits, there are flags that can be written to mode registers or sent to the back to the host 112 of the SoC 110. This would indicate that the DRAM 140 detected errors in the ECC circuits, and either did what it was supposed to or didn't do what it was supposed to do. In this way, if the behavior departs from the expected behavior, then there is an error in the ECC data path.

At block 402, the DRAM 140 detects an error in the ECC circuits. Error detection mechanisms include parity checks, syndrome calculations, and syndrome analysis. Parity checks may include single-bit parity checks or double-bit parity checks. Regarding syndrome calculations, when data is read, the ECC circuitry recalculates the check bits and compares them to the stored check bits to produce the syndrome.

At block 404, it is determined that the DRAM 140 cannot correct the error. If so, at least two paths can be followed.

At block 410 in a first path, a flag is written in a mode register to indicate the ECC data path error 412. Mode registers in DRAM are special registers used to control various operating modes and configurations of the memory. Mode registers also serve to report errors and status information back to the memory controller. Upon detecting an ECC data path error, the ECC logic sets an error flag. The error flag is a specific bit or set of bits in the mode register designated for error reporting.

At block 420, in a second path, a notification is sent to the host 112 of the SoC 110 to indicate the ECC data path error 412. Upon detecting an ECC data path error flag, the memory controller may generate an interrupt or alert to notify the host 112 to ensure that the error is promptly addressed.

When the host 112 determines where the error is located, then upon reading back of the data, the host 112 can determine whether the bit has been corrected as expected. The DRAM 140 does not determine whether the bit has been corrected, only the host 112 does. The host 112 also determines if it has exceeded the error correcting capabilities of the DRAM base on the error mask. This should trigger an uncorrectable error that the DRAM flags.

Figure 5:
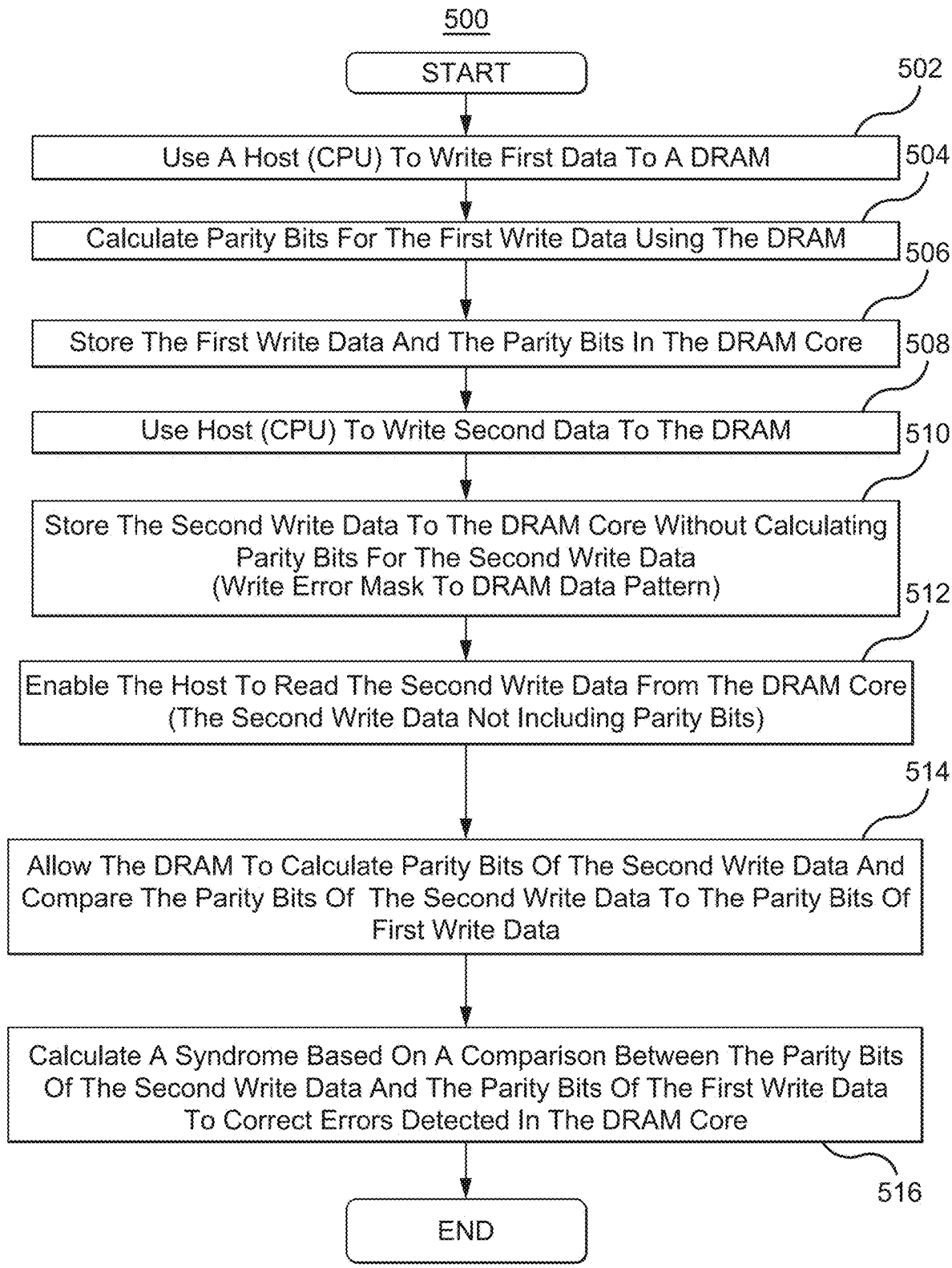
FIG. 5 illustrates a method for implementing the system of FIG. 1, according to an example.

FIG. 5 illustrates a method 500 for implementing the system of FIG. 1, according to an example.

At block 502, a host (CPU) writes first data to a DRAM. The host selects the address in the DRAM where the first data is to be written. The host issues a write command to the DRAM, the command including the target address and the data to be written.

At block 504, parity bits are calculated for the first write data. The parity bits are calculated by counting the number of "1s" in a data word and setting the parity bit to ensure the total number of "1s" (including the parity bit) meets the parity condition (even or odd). The parity bits are appended to the data word and written to the DRAM. This allows for error detection during subsequent read operations, to ensure data integrity. ECC methods may use multiple check bits to provide for enhanced error detection and correction capabilities.

At block 506, the first write data and the parity bits are stored in the DRAM core. Parity bits may be interleaved with the data in the memory cells, that is, each data block has its associated parity bit stored in a nearby location. Alternatively, parity bits may be stored in a separate, dedicated region of the DRAM.

At block 508, the host (CPU) writes second data to the DRAM. Once again, the host selects the address in the DRAM where the second data is to be written. The host issues a write command to the DRAM, the command including the target address and the data to be written.

At block 510, the second write data is stored to the DRAM core without calculating parity bits for the second write data (write error mask to DRAM data pattern). Writing an error mask to the DRAM pattern refers to the process of intentionally applying a bitmask to data being written to DRAM to simulate or test error conditions. This may be useful for testing error detection and correction mechanisms to ensure that the system can properly handle errors.

At block 512, the host reads the second write data from the DRAM core (the second write data not including parity bits). When the read is performed, the DRAM processes the data according to the calculated syndrome and corrects errors if possible. As such, the actual "read" data will not necessarily be the same as the data that was written.

At block 514, the DRAM calculates parity bits of the second write data and compare the parity bits of the second write data to the parity bits of the first write data. The correct data (first write data) is compared with the erroneous data (second write data). In particular, the parity bits of the correct data are compared with the parity bits of the erroneous data. If a mismatch is detected between the parity bits, this indicates an error has occurred.

At block 516, a syndrome is calculated based on a comparison between the parity bits of the second write data and the parity bits of the first write data to correct errors detected in the DRAM core. In one example, the syndrome value points to the position of the error in the data word. The error is corrected by flipping the bit at the position indicated by the syndrome to correct the error. As such, high data reliability and integrity can be ensured.

Figure 6:
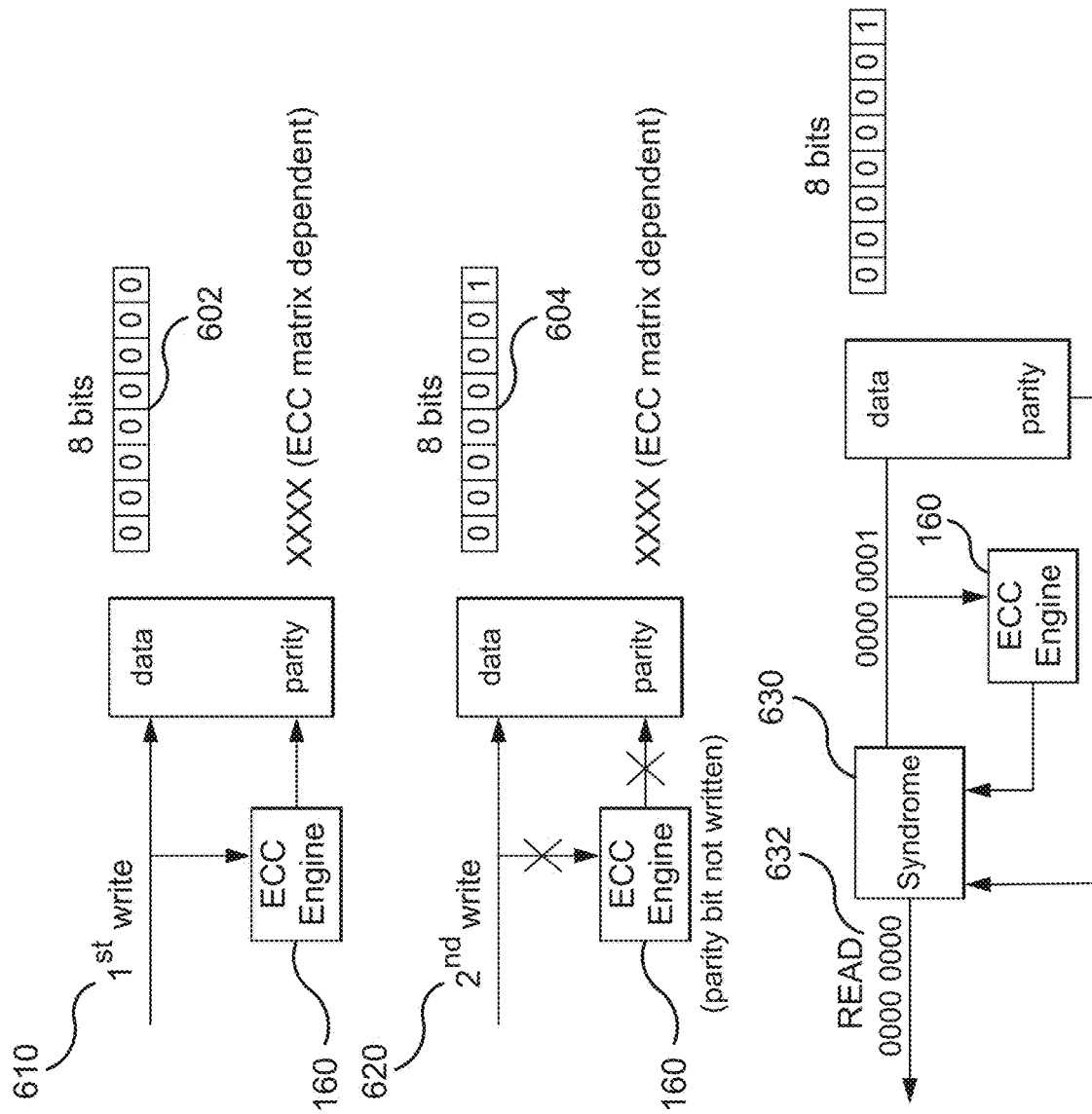
FIG. 6 illustrates writing an error mask to the DRAM data pattern, according to an example.

FIG. 6 illustrates writing an error mask to the DRAM data pattern, according to an example.

In one example, first write data 610 is written by the host to the DRAM. The first write data 610 may be an 8-bit array 602. The 8-bit array 602 may include 8 bits all being zero, that is, 0000 0000. The DRAM then calculates the parity bits for the first write data 610. The DRAM stores the first write data 610 and the parity bits in the DRAM core.

Subsequently, second write data 620 is written by the host to the DRAM. The second write data 620 is a new set of data. The second write data 620 is also erroneous data. The 8-bit array 604 may include 8 bits where the last bit is "1," that is, 0000 0001. Parity bits are not calculated for the second write data 620. The delta in the first write data 610 and the second write data 620 defines an error pattern.

The host then reads the data from the DRAM core. The DRAM then calculates the syndrome 630. The syndrome 630 is used in error correction techniques (e.g., in the ECC 160 engine) to identify and correct errors in the DRAM. The ECC scheme uses codes that generate the syndrome based on the observed errors in the memory data. The ECC engine 160 corrects the error, that is, the "1" in the 8-bit array 604 is corrected to a "0." Thus, the DRAM corrects the error before the host reads the data from the DRAM core so that the host reads the 8-bit array 632. The DRAM can also flag the severity of the error. Stated differently, the DRAM flags the errors for different levels of severity. These levels typically range from minor errors that can be corrected in real-time to critical errors that may involve system intervention or reconfiguration.

The second write can also be referred to as a special write, as it does not include any parity calculations. The special write would be enabled in a test mode. The special write may be enabled by one of the three implementations described above.

In one practical application, errors may be detected in automotive ECC circuits. Automotive Error Correction Code (ECC) circuits are specialized components used in automotive electronic systems to detect and correct errors in memory. These circuits are important in ensuring the reliability and safety of automotive systems, where even small errors can have significant consequences.

Automotive ECC circuits are designed to meet stringent reliability and safety standards required for automotive applications. They must operate reliably in harsh environmental conditions, including temperature extremes, vibrations, and electromagnetic interference.

ECC circuits in automotive applications typically employ sophisticated error detection and correction algorithms to ensure the integrity of data stored in memory. These algorithms use redundancy and error correction techniques to detect and correct errors caused by factors such as cosmic rays, electromagnetic interference, and manufacturing defects.

Many automotive ECC circuits use the Single Error Correction, Double Error Detection (SEC-DED) technique, which can correct single-bit errors and detect double-bit errors. This provides a balance between error correction capability and hardware complexity.

Automotive ECC circuits can be implemented in various ways, including as standalone ECC chips, integrated into memory controllers, or embedded directly into memory modules. The choice of implementation depends on factors such as system architecture, performance requirements, and cost considerations.

ECC circuits often include built-in self-test capabilities to verify their functionality and detect any faults. Built-in self-test (BIST) routines can be executed during system initialization or periodically to ensure that the ECC circuitry is operating correctly.

Overall, automotive ECC circuits play an important role in ensuring the reliability, safety, and integrity of data stored in memory within automotive electronic systems. Their robust error detection and correction capabilities help mitigate the risk of data corruption and system failures, contributing to the overall dependability of modern automotive technology.

As such, the systems and methods described herein employ ECC circuits in DRAM that have the capability to detect errors within themselves, for example, in ECC automotive applications. Of course, other practical applications can also be contemplated.

In conclusion, the example implementations test the entire ECC circuit path including the DRAM and the system-on-chip (SoC) by allowing the host to write first data to the DRAM, calculating parity bits for the first write data, storing the first write data and the parity bits in a DRAM core of the DRAM, allowing the host to write second data to the DRAM, and storing the second write data in the DRAM core without calculating parity bits for the second write data. The example implementations then allow the host to read the second write data from the DRAM core, enable the DRAM to calculate parity bits of the second write data and compare the parity bits of the second write data to the parity bits of the first write data, and calculate a syndrome based on a comparison between the parity bits of the second write data and the parity bits of the first write data to correct errors detected in the DRAM core. The special write operation without the without the parity calculation can be enabled in the test mode by various methodologies. In one instance, the original correct data is not written and a wait is employed for the erroneous data before writing. In another instance, the parity bit writes are masked when writing the erroneous data. In yet another instance, the original check bits are stored and written with the erroneous data.

Therefore, the example implementations test all the ECC circuit paths. This is achieved by using a new protocol. The new protocol is a write protocol. The write protocol is a new type of command code. The command code designates a "write without parity calculation." For example, first data is written to the DRAM core. Parity bits for the first data is calculated by the ECC engine of the DRAM. Then, second data is written to the DRAM core. However, parity bits are not calculated for the second data. This is the new write protocol, which includes a special command. The special command is "write without parity calculation." Since parity bits are not calculated for the second data, the second data can be referred to as erroneous data. The test pattern is defined by a delta between the first data (with parity calculation) and the second data (without parity calculation).

The special command would be enabled in a test mode. In other words, the new test mode to test the ECC circuit would include the special command instructing a write of certain data without parity calculation. The test mode including the special command can be implemented in three ways described above.

In the preceding, reference is made to implementations presented in this disclosure. However, the scope of the present disclosure is not limited to specific described implementations. Instead, any combination of the described features and elements, whether related to different implementations or not, is contemplated to implement and practice contemplated implementations. Furthermore, although implementations disclosed herein may achieve advantages over other possible solutions or over the prior art, whether or not a particular advantage is achieved by a given implementation is not limiting of the scope of the present disclosure. Thus, the preceding aspects, features, implementations and advantages are merely illustrative and are not considered elements or limitations of the appended claims except where explicitly recited in a claim(s).

As will be appreciated by one skilled in the art, the implementations disclosed herein may be embodied as a system, method or computer program product. Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to implementations presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present implementation. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A system comprising:
   a system-on-chip (SoC) including at least a host; and
   a dynamic random-access memory (DRAM) in communication with the SoC, the DRAM including at least an error correction code (ECC) engine, the system configured to:
      calculate, using the DRAM, parity bits for first write data;
      store the first write data and the parity bits in a DRAM core of the DRAM;
      store second write data in the DRAM core without calculating parity bits for the second write data;
      enable the DRAM to calculate the parity bits of the second write data and compare the parity bits of the second write data to the parity bits of the first write data; and
      calculate a syndrome based on a comparison between the parity bits of the second write data and the parity bits of the first write data to correct errors detected in the DRAM core.

2. The system of claim 1, wherein the second write data is used to calculate the parity bits for the first write data without overwriting the first write data.

3. The system of claim 1, wherein, when the errors are detected in the DRAM core, the DRAM flags the errors for different levels of severity.

4. The system of claim 1, wherein the second write data is erroneous data.

5. The system of claim 1, wherein, after the parity bits are calculated for the first write data, a mask pattern defining error positions is written, the mask pattern configured to flip bits of the first write data.

6. The system of claim 1, wherein the second write data is written to the DRAM core without performing parity bit calculations to the second write data.

7. The system of claim 1, wherein the second write data designating an error pattern is written in the DRAM core with the parity bits calculated from the first write data.

8. A dynamic random-access memory (DRAM) comprising:
   a DRAM core; and
   an error correction code (ECC) engine, the DRAM communicating with a system-on-chip (SoC) to:
      calculate, using the DRAM, parity bits for first write data;
      store the first write data and the parity bits in a DRAM core of the DRAM;
      store second write data in the DRAM core without calculating parity bits for the second write data;
      enable the DRAM to calculate the parity bits of the second write data and compare the parity bits of the second write data to the parity bits of the first write data; and
      calculate a syndrome based on a comparison between the parity bits of the second write data and the parity bits of the first write data to correct errors detected in the DRAM core.

9. The DRAM of claim 8, wherein the second write data is used to calculate the parity bits for the first write data without overwriting the first write data.

10. The DRAM of claim 8, wherein, when the errors are detected in the DRAM core, the DRAM flags the errors for different levels of severity.

11. The DRAM of claim 8, wherein the second write data is erroneous data.

12. The DRAM of claim 8, wherein, after the parity bits are calculated for the first write data, a mask pattern defining error positions is written, the mask pattern configured to flip bits of the first write data.

13. The DRAM of claim 8, wherein the second write data is written to the DRAM core without performing parity bit calculations to the second write data.

14. The DRAM of claim 8, wherein the second write data designating an error pattern is written in the DRAM core with the parity bits calculated from the first write data.

15. A method comprising:
    calculating, using a dynamic random-access memory (DRAM), parity bits for first write data;
    storing the first write data and the parity bits in a DRAM core of the DRAM;
    storing second write data in the DRAM core without calculating parity bits for the second write data;

enabling the DRAM to calculate the parity bits of the second write data and compare the parity bits of the second write data to the parity bits of the first write data; and calculating a syndrome based on a comparison between the parity bits of the second write data and the parity bits of the first write data to correct errors detected in the DRAM core.

16. The method of claim 15, wherein the second write data is used to calculate the parity bits for the first write data without overwriting the first write data.

17. The method of claim 15, wherein the second write data is erroneous data.

18. The method of claim 15, wherein, after the parity bits are calculated for the first write data, a mask pattern defining error positions is written, the mask pattern configured to flip bits of the first write data.

19. The method of claim 15, wherein the second write data is written to the DRAM core without performing parity bit calculations to the second write data.

20. The method of claim 15, wherein the second write data designating an error pattern is written in the DRAM core with the parity bits calculated from the first write data.

* * * * *